(12) United States Patent
Yu

(10) Patent No.: US 7,192,385 B2
(45) Date of Patent: Mar. 20, 2007

(54) UPSHIFT CONTROL METHOD OF A VEHICLE AUTOMATIC TRANSMISSION

(75) Inventor: Pyung Hwan Yu, Suwon (KR)

(73) Assignee: Hyundai Motor Company, Seoul (KR)

( * ) Notice: Subject to any disclaimer, the term of this patent is extended or adjusted under 35 U.S.C. 154(b) by 307 days.

(21) Appl. No.: 11/016,213

(22) Filed: Dec. 17, 2004

(65) Prior Publication Data
US 2005/0137054 A1 Jun. 23, 2005

(30) Foreign Application Priority Data
Dec. 17, 2003 (KR) ............... 10-2003-0092646

(51) Int. Cl.
*B60W 10/02* (2006.01)
*B60W 10/04* (2006.01)
*F16H 59/64* (2006.01)

(52) U.S. Cl. .............. 477/176; 477/181; 477/109; 477/98

(58) Field of Classification Search ............. 477/59, 477/62, 64, 109, 98, 169, 175, 176, 181
See application file for complete search history.

(56) References Cited

U.S. PATENT DOCUMENTS 5,131,294 A * 7/1992 Yoshimura ............ 477/109
5,480,363 A * 1/1996 Matsubara et al. ............ 477/63
6,471,620 B2 * 10/2002 Lee ......................... 477/181
6,893,379 B2 * 5/2005 Sakamoto et al. ......... 477/175

FOREIGN PATENT DOCUMENTS

| JP | 07-042825 | | 2/1995 |
| JP | 07-279700 | | 10/1995 |
| JP | 02003262148 A | * | 9/2003 |
| KR | 10-2003-0050766 | | 6/2003 |

* cited by examiner

*Primary Examiner*—Roger Pang
(74) *Attorney, Agent, or Firm*—Morgan Lewis & Bockius LLP

(57) ABSTRACT

The upshift control method of an automatic transmission for vehicles includes determining whether a start condition of a damper clutch control operation is satisfied during an upshift under a power-off. The method also includes executing the damper clutch control operation depending on predetermined control intervals and control duties in order to enhance a shift feel, the predetermined control intervals and control duties being set on the basis of a shift speed, a turbine RPM, and a transmission oil temperature, when the start condition of the damper clutch operation control is satisfied. The method further includes executing a fuel cut control after a damper clutch is engaged by the damper clutch control operation.

8 Claims, 4 Drawing Sheets

PRIOR ART

UPSHIFT CONTROL METHOD OF A VEHICLE AUTOMATIC TRANSMISSION

CROSS REFERENCE TO RELATED APPLICATION

This application claims priority to and the benefit of Korean Patent Application No. 10-2003-0092646, filed in the Korean Intellectual Property Office on Dec. 17, 2003, the entire content of which is incorporated herein by reference.

FIELD OF THE INVENTION

The present invention relates to an automatic transmission for vehicles. More particularly, the present invention relates to an upshift control method of an automatic transmission for vehicles.

BACKGROUND OF THE INVENTION

Generally, a vehicle's automatic transmission (AT) automatically shifts into a target shift speed based on vehicle-speed, throttle opening, etc Such ATs include on-coming elements and off-going elements. Accordingly, while the shift speed is shifted into the target shift speed, the off-going elements are disengaged by a hydraulic control, and the on-coming elements are engaged by the hydraulic control.

In particular, these ATs include a torque converter having a damper clutch, and a power-train having a shift gear mechanism, as the on-coming or the off-going elements. However, vehicles with ATs have a problem in that fuel is unnecessarily wasted. That is, since energy is consumed by a slip in the torque converter, the vehicles with ATs have a problem in that fuel mileage is decreased as compared to vehicles with manual transmissions.

In addition, because of such a decrease of fuel mileage, the vehicles with ATs expel exhaust gas that includes noxious substances. This exhaust gas leads to environmental pollution.

Accordingly, to decrease such fuel waste, damper clutch control methods of vehicle automatic transmissions have been provided. Such damper clutch control methods of vehicle automatic transmissions engage a damper clutch during an inertia travel under a power-off state (when the driver's foot is removed from the gas), in order to intercept the slip in the torque converter, that is, in order for an engine RPM to maintain equally to a turbine RPM.

According to the method, since an engine output-shift and an AT input-shift are engaged with each other by the damper clutch, slip in the toque converter is not generated. Since the slip of the torque converter is not generated, fuel mileage is improved. Furthermore, since, if the damper clutch is engaged during the inertia travel under a power-off state, torque of the AT is transmitted into an engine, and the engine RPM is slowly decelerated. Accordingly, since a fuel cut time becomes longer, the fuel mileage can be enhanced.

The damper clutch control method of an automatic transmission for vehicles will hereinafter be explained in detail with reference to FIG. 4. Firstly, while a vehicle is traveling at a second speed in a power-on state, an engine RPM A is shown higher than a turbine RPM B. After this, the power-off state is initiated and the shift speed is up-shifted into a third speed.

After this, when various conditions of an oil temperature, an engine RPM, and a turbine RPM, etc., satisfy an engagement condition of the damper clutch, the damper clutch is engaged. After a predetermined interval, the shift speed is up-shifted into a fourth speed. However, while the shift speed is being up-shifted into the fourth speed, the engaged damper clutch is disengaged in order to enhance shift feel.

However, the damper clutch control method of an automatic transmission has the following problems. Firstly, since the engaged damper clutch is disengaged while the shift speed is being up-shifted into the fourth speed, the engine RPM is rapidly decelerated in comparison with the turbine RPM. Accordingly, as shown in FIG. 4, a difference between the engine RPM and the turbine RPM becomes larger. Consequently, a problem occurs that the damper clutch is not engaged while the vehicle is traveling at the fourth speed.

In addition, since an exchange of information does not occurr between an engine control unit (ECU) and an AT control unit (TCU), a fuel-cut control and the damper clutch control are independently executed. Accordingly, a problem occurs that efficiency of this method is decreased.

In addition, there is a range that the damper clutch control can not be executed. For example, the prior damper clutch control method is not applied while the vehicle is traveling in the power-on state, and while the shift speed is being up-shifted into any speed in the power-off state. Accordingly, since the application range of the prior damper clutch control method is very limited, a problem occurs that efficiency of the prior method is decreased.

In addition, since the damper clutch control is executed during the power-off state, oil generated by an oil pump is very small. Accordingly, a problem occurs in that time for controlling the damper clutch is retarded.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides an upshift control method of an automatic transmission for vehicles having non-limiting advantages of enhanced fuel mileage and enhanced shift feel.

An exemplary upshift control method of an automatic transmission for vehicles according to an embodiment of the present invention includes: determining whether a start condition of a damper clutch control operation is satisfied during an upshift under a power-off; executing the damper clutch control operation depending on predetermined control intervals and control duties in order to enhance a shift feel, the predetermined control intervals and control duties being set on the basis of a shift speed, a turbine RPM, and a transmission oil temperature, when the start condition of a damper clutch control operation is satisfied; and executing a fuel cut control after a damper clutch is engaged by the damper clutch control operation.

In another embodiment according to the present invention, the method further includes disengaging the damper clutch and finishing the fuel cut control if a predetermined disengagement condition of the damper clutch exists.

In a further embodiment according to the present invention, the fuel cut control is executed depending on a dual fuel cut map in order to enlarge a fuel cut range, the dual fuel cut map having different fuel-cut ranges for an engagement state of the damper clutch and a disengagement state of the damper clutch.

In a further embodiment according to the present invention, the start condition of the damper clutch operating control is determined to exist: when a throttle opening is lower than a predetermined opening; when a turbine RPM is higher than a first predetermined RPM; when a transmission oil temperature is higher than a predetermined temperature; when the turbine RPM is higher than a second predetermined RPM calculated by adding a compensation RPM to a predetermined fuel-cut recovery RPM under an engagement of the damper clutch; when a current shift speed is higher than a predetermined shift speed; when a vehicle does not travel on a downgrade; and when a damper clutch is in the direct engagement state before the upshift.

In a further embodiment according to the present invention, the control intervals include a first control interval, a second control interval, and a third control interval; and the control duties include a first control duty, a second control duty, and a third control duty. Furthermore, the damper clutch control operation includes: outputting the first control duty during the first control interval, when the upshift is started in the power-off state; outputting the second control duty during the second control interval after the first control interval; outputting the third control duty during the third control interval after the second control interval; and operating feed back control in order for slip quantity of torque converter to reach target slip quantity after the third control interval.

In a further embodiment according to the present invention, the damper clutch control operation further includes increasing a control duty by a predetermined gradient in order to further enhance shift feel, when the slip quantity of the torque converter reaches the target slip quantity.

In a still further embodiment according to the present invention, the damper clutch control operation further includes finishing the damper clutch control operation, when a slip quantity detected during the first control interval is higher than a reference slip quantity.

In a further embodiment according to the present invention, the disengagement condition of the damper clutch is determined to exist: when a turbine RPM is lower than a third predetermined RPM for intercepting shock when the fuel cut control is finished; when a throttle opening is higher than a predetermined opening, that is, the throttle opening is in condition of a power-on; when the turbine RPM is lower than a first predetermined RPM; when the turbine RPM is lower than a second predetermined RPM, calculated by adding a compensation RPM to a fuel cut recovery RPM; when a changing rate (%/sec) of the throttle opening is higher than a predetermined changing rate; when a slope rate (%) is higher than a predetermined slope rate; or when a slip quantity (engine RPM—turbine RPM) is higher than a predetermined RPM.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
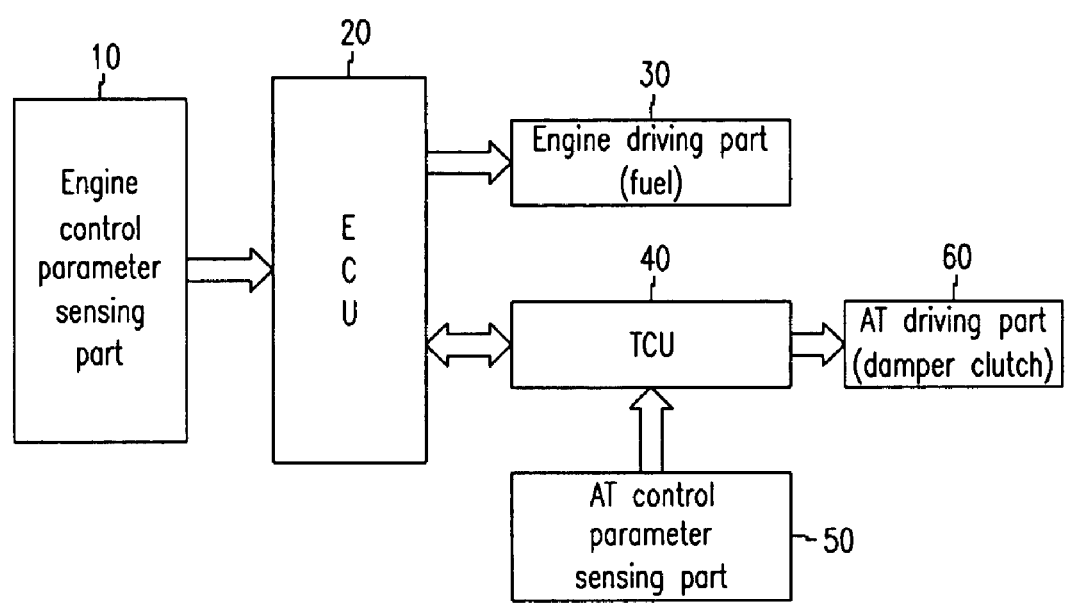
FIG. 1 is a block diagram of a device executing an upshift control method of an automatic transmission for vehicles according to an embodiment of the present invention.

FIG. 1 is a block diagram of a device executing an upshift control method of an automatic transmission for vehicles according to an embodiment of the present invention. As shown in FIG. 1, a device executing an upshift control method of an automatic transmission for vehicles according to an embodiment of the present invention includes: an engine control parameter sensing part 10 having many kinds of sensors; an engine control unit (ECU) 20 comparing pre-inputted information with current driving information of a vehicle inputted from the engine control parameter sensing part 10; and an engine driving part 30 controlled by the ECU 20.

In addition, the device for controlling an upshift of a vehicle with an automatic transmission according to an embodiment of the present invention includes: an automatic transmission (AT) control parameter sensing part 50; a transmission control unit (TCU) 40 comparing pre-inputted information with both information inputted from the ECU 20 and information inputted from the AT control parameter sensing part 50; and an AT driving part 60 controlled by the TCU 40.

As is well-known in the art, the engine control parameter sensing part 10 includes: a throttle position sensor; a turbine RPM sensor; a vehicle speed sensor; a crank angle sensor; and a coolant temperature sensor, in order to detect all information for controlling an engine.

The AT control parameter sensing part 50 includes: an input/output shaft speed sensor; an oil temperature sensor; an inhibitor switch; and a brake switch, in order to detect information for controlling an AT.

The engine driving part 30 includes all driving parts for controlling the engine. However, in some embodiments, the driving part for an engine control is a driving part for controlling fuel. The AT driving part 60 includes all solenoid valves for controlling on-coming elements and off-going elements. However, in some embodiments, the driving part for an AT control is a solenoid valve for controlling a damper clutch.

In addition, to information exchanged between the ECU 20 and the TCU 40, a controller area network (CAN) communication or a SIRIAL communication may be utilized.

In addition, it is preferable that a dual fuel cut map is predetermined in the ECU 20 in order to increase a fuel cut range. In particular, the dual fuel cut map includes a first fuel cut range under an engagement of the damper clutch and a second fuel cut range under a disengagement thereof. Furthermore, the first and the second fuel cut range are predetermined differently in the ECU 20. As an example, since an engine RPM under the engagement of the damper clutch is higher than an engine RPM under a disengagement thereof, a fuel cut RPM (a first predetermined RPM) under the engagement of the damper clutch can be predetermined higher than a fuel cut RPM (a second predetermined RPM) under a disengagement thereof.

Furthermore, since an engine RPM under the engagement of the damper clutch is more slowly decreased than an engine RPM under the disengagement thereof, a fuel cut recovery RPM (a third predetermined RPM) under the engagement of the damper clutch can be predetermined lower than a fuel cut recovery RPM (a fourth predetermined RPM) under the disengagement thereof.

Accordingly, in comparison with the prior art, an upshift control method of an automatic transmission for vehicles according to an embodiment of the present invention can enlarge the fuel cut range as a difference between the first RPM and the second RPM, and as a difference between the third RPM and the fourth RPM.

The TCU 40 and the ECU 20 can be realized by one or more processors activated by a predetermined program, and the predetermined program can be programmed to perform each step of a method according to an embodiment of this invention.

Figure 2:
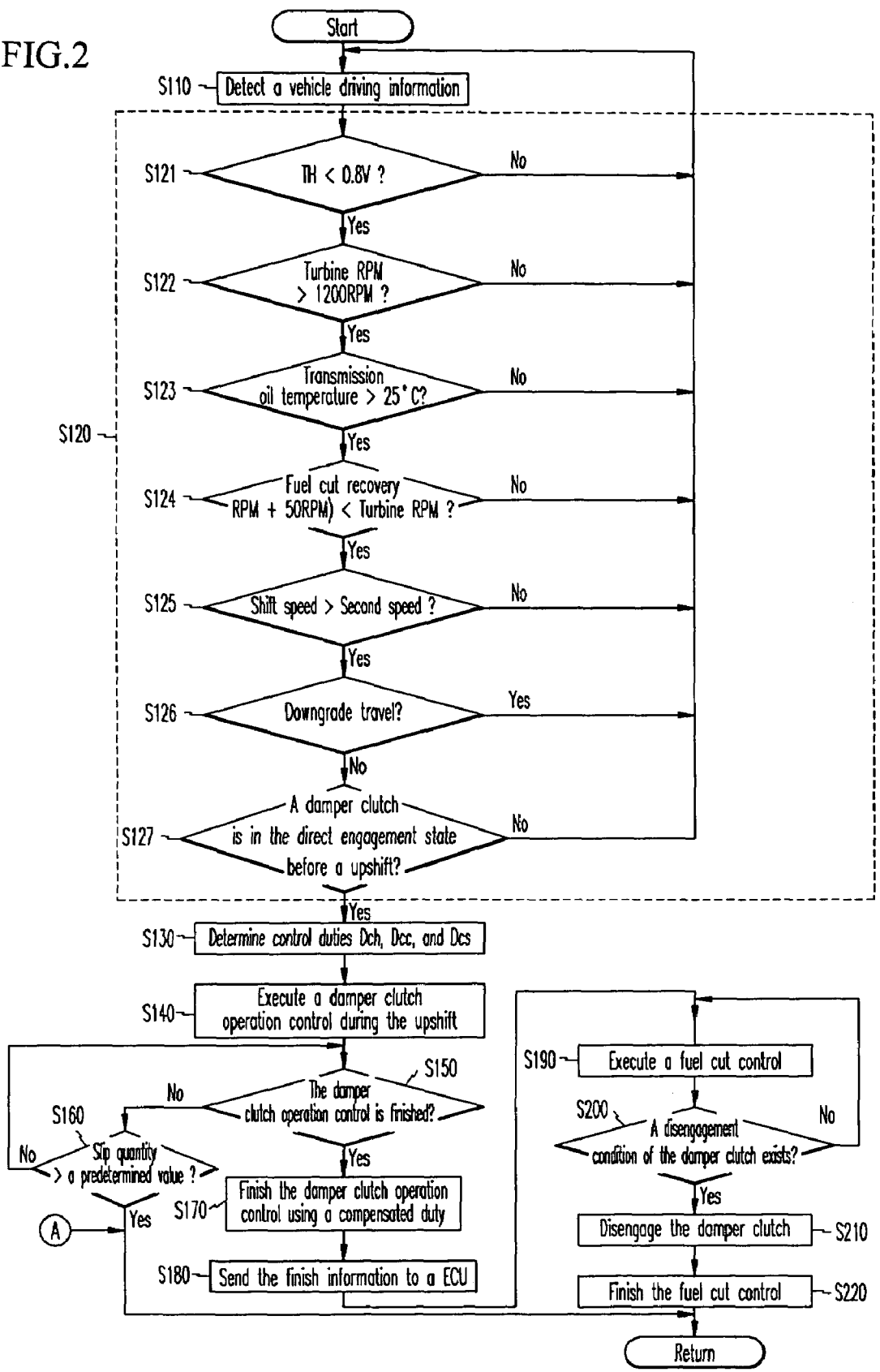
FIG. 2 is a flowchart showing an upshift control method of an automatic transmission for vehicles according to an embodiment of the present invention.
Figure 3:
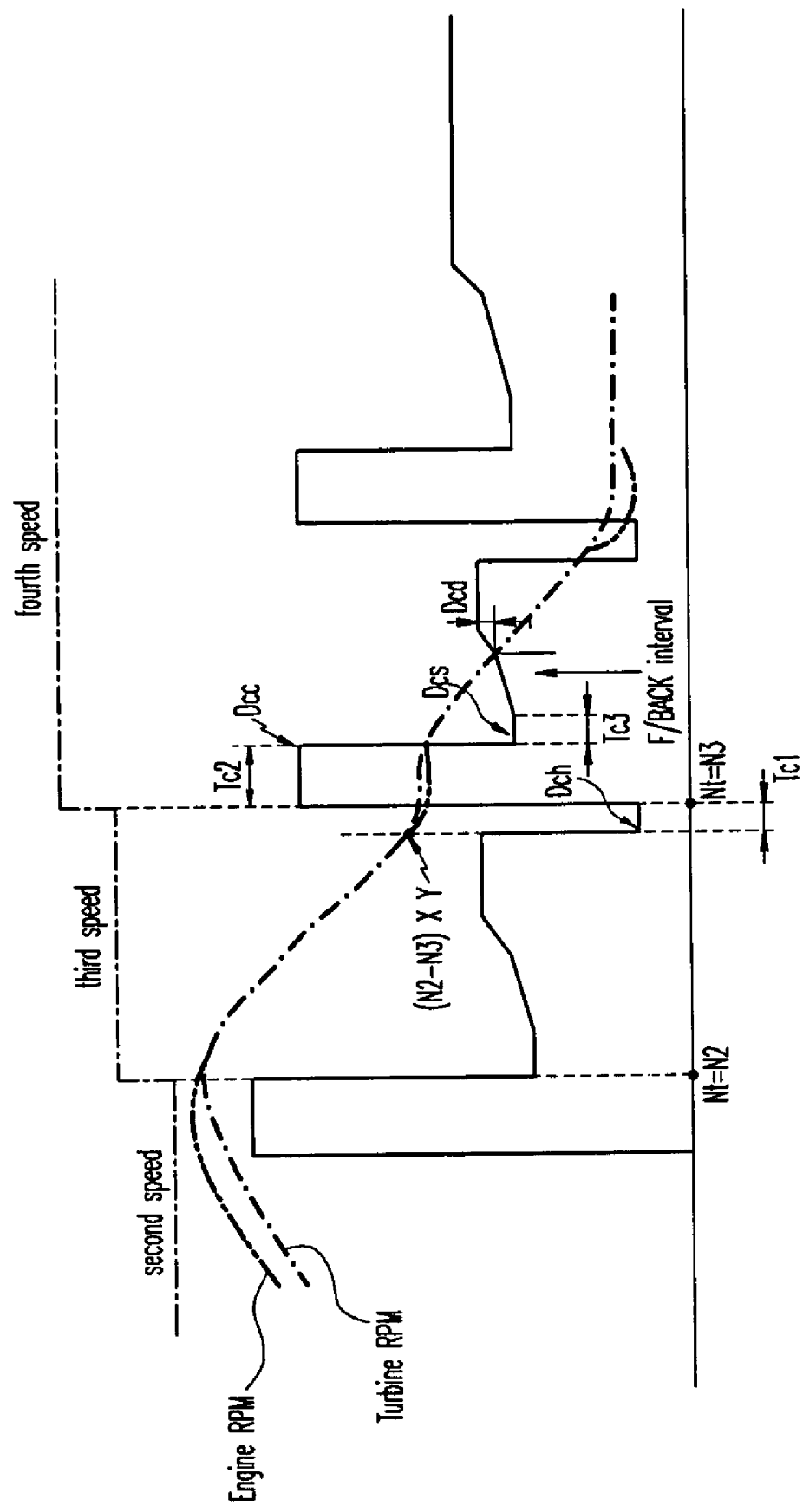
FIG. 3 is a graph showing a control duty of a damper clutch, and relation between an engine RPM and a turbine RPM, with respect to time and each shift speed, in an upshift control method of an automatic transmission for vehicles according to an embodiment of the present invention.
Figure 4:
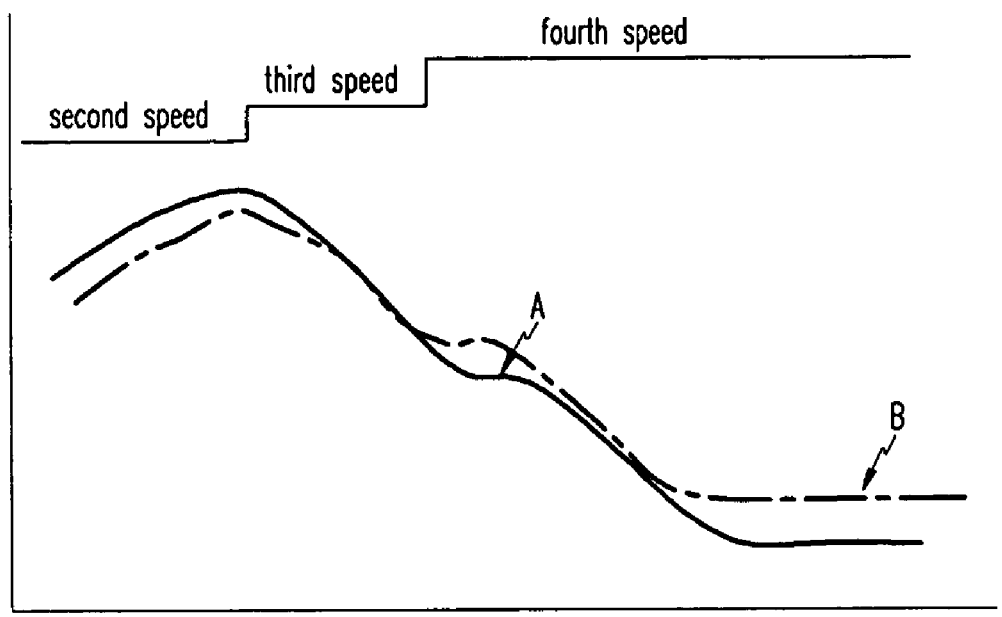
FIG. 4 is a graph showing the relation between an engine RPM and a turbine RPM with respect to time and each shift speed, in a conventional damper clutch control method.

FIG. 2 is a flowchart showing an upshift control method of an automatic transmission for vehicles according to an embodiment of the present invention, and FIG. 3 is a graph showing a control duty of a damper clutch, and a relation of both an engine RPM and a turbine RPM, with respect to time and each speed, in an upshift control method of an automatic transmission for vehicles according to an embodiment of the present invention.

An upshift control method of an AT for vehicles according to an embodiment of the present invention will hereinafter be described in detail with reference to the FIGS. 2 and 3. Firstly, at step S110, the ECU 20 and the TCU 40 recognize various driving information of the vehicle while a vehicle is traveling at any speed (for example, "second speed" of FIG. 3) in a power-on state (i.e., where the vehicle is operating under power). The TCU 40 determines whether the driving information of the vehicle detected by the AT control parameter sensing part 50 is information of an upshift in a power-off state.

At step 120, the TCU 40 determines whether a start condition of a damper clutch operation control is detected during the upshift in the power-off state. In some embodiments, the start condition of the damper clutch operation control is determined to exist if all of following cases are satisfied:

1. at step S121, a throttle opening TH is lower than a predetermined opening (for example, 0.8V);

2. at step S122, a turbine RPM is higher than a fifth predetermined RPM (for example, 1,200 RPM);

3. at step S123, a transmission oil temperature is higher than a predetermined temperature (for example, 25° C.);

4. at step S124, the turbine RPM is higher than a sixth predetermined RPM calculated by adding a compensation RPM (for example, 50 RPM) to a predetermined fuel-cut recovery RPM (the third predetermined RPM) under an engagement of a damper clutch;

5. at step S125, a current shift speed is higher than the second speed;

6. at step S126, the vehicle does not travel on a downgrade; and 7. at step S127, a damper clutch is in the direct engagement state before the upshift.

Accordingly, when all the cases are detected by the AT control parameter sensing part 50, the TCU 40 executes the damper clutch operation control.

The damper clutch operation control will hereinafter be explained in detail. At step 130, as shown in FIG. 3, a first control interval, a second control interval, and a third control interval (see "Tc1, Tc2, and Tc3" of FIG. 3) and a first control duty, a second control duty, and a third control duty (see "Dch, Dcc, and Dcs" of FIG. 3) are predetermined on the basis of each shift speed, a turbine RPM, and a transmission oil temperature.

At step 140, when the upshift is started toward a next speed (see reference "fourth speed" of FIG. 3) in the power-off state, that is, when the turbine RPM Nt becomes equal to a value (N2−N3)*Y that is calculated by multiplying a difference (N2−N3) between a second speed synchronous turbine RPM N2 and a third speed synchronous turbine RPM N3 by a predetermined value Y, the TCU 40 executes the damper clutch control operation in order to enhance a shift feel during the upshift. In some embodiments, it can be determined that a shock occurs at a point when a condition of [Nt<(N2−N3)*Y] exists, and such a predetermined value Y may be determined through experiments.

The damper clutch control operation will hereinafter be described in detail. While the damper clutch control operation is executed, the TCU 40 outputs the first control duty Dch at a point when the turbine RPM Nt is equal to the value (N2−N3)*Y, and the TCU 40 maintains the first control duty Dch during the first control interval Tc1.

After the first control interval Tc1, the TCU 40 outputs the second control duty Dcc, and maintains the second control duty Dcc during the second control interval Tc2. After the second control interval Tc2, the TCU 40 outputs the third control duty Dcs, and maintains the third control duty Dcs during the third control interval Tc3.

In addition, the TCU 40 determines whether a slip quantity (engine RPM—turbine RPM) detected by the AT control parameter sensing part 50 during the third control interval Tc3 satisfies a predetermined slip quantity, and when the detected slip quantity satisfies the predetermined slip quantity, starts a feed back control interval (F/BACK).

At step S150, the TCU 40 determines whether a slip quantity (engine RPM—turbine RPM) detected by the AT control parameter sensing part 50 satisfies a target slip quantity during the feed back control interval (F/BACK), and when the detected slip quantity satisfies the target slip quantity, finishes the damper clutch control operation. That is, the AT driving part 60 engages the damper clutch.

Particularly, at step S170, the TCU 40 increases a control duty Dcd by a predetermined gradient (for example, 5%) in order for the damper clutch to be more safely engaged before the damper clutch control operation is finished. When the damper clutch control operation is finished at the step S170, the TCU 40 sends, at step S180, the finished information to the ECU 20.

Accordingly, the ECU 20 controls the engine driving part 30 according to the above-described first RPM (a fuel cut RPM predetermined under an engagement of a damper clutch) and the above-described third RPM (a fuel cut recovery RPM predetermined under an engagement of a damper clutch). That is, at step 190, the ECU 20 executes a fuel cut control.

On the other hand, as shown in FIG. 2, at step S160, when a slip quantity detected during the first control interval Tc1 is higher than a reference slip quantity, the TCU 40 determines that the damper clutch control operation is impossible, and starts the damper clutch operation again.

On the other hand, while the fuel cut control is executed, at step 200, the TCU 40 determines whether information detected by the AT control parameter sensing part 50 satisfies a disengagement condition of the damper clutch.

The disengagement condition of the damper clutch may be determined to exist if at least one of following cases is satisfied:

1. a turbine RPM is lower than a seventh predetermined RPM (RPM predetermined for intercepting a shock generated when the fuel cut control is finished);

2. a throttle opening TH is higher than the predetermined opening (for example, 0.8V), that is, throttle opening is in a condition of power-on;

3. the turbine RPM is lower than the fifth predetermined RPM (for example, 1,200 RPM);

4. the turbine RPM is lower than the sixth predetermined RPM calculated by adding a compensation RPM (for example, 50 RPM) to the predetermined fuel cut recovery RPM (the third predetermined RPM) under the engagement of the damper clutch;

5. a changing rate (%/sec) of throttle opening is higher than a predetermined changing rate;

6. a slope rate (%) is higher than a predetermined slope rate; and 7. a slip quantity (engine RPM—turbine RPM) is higher than a predetermined RPM.

Accordingly, when at least one of the cases is detected by the AT control parameter sensing part 50 at the step 200, the TCU 40 disengages, at step 210, the damper clutch, and sends this disengagement information to the ECU 20.

Accordingly, at step 220, the ECU 20 releases the fuel cut control according to the disengagement information, and initiates a fuel injection.

As has been explained, the upshift control method of an automatic transmission of vehicles according to embodiments of the present invention has the following advantages. According to embodiments of the present invention, since the damper clutch is engaged during the upshift in a power-off state, and the fuel cut control is operated, a fuel cut range can be increased. In addition, according to embodiments of the present invention, since a damper clutch is engaged during the upshift in a power-off state, a hysteresis loss is not generated during that period.

In addition, according to embodiments of the present invention, since a dual fuel cut map is predetermined in the ECU, the fuel cut range can be increased. All the advantages described in the specification are inclusive.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A upshift control method of an automatic transmission, comprising:
   determining whether a start condition of a damper clutch control operation is satisfied during an upshift in a power-off state;
   executing the damper clutch control operation depending on predetermined control intervals and control duties in order to enhance shift feel, the predetermined control intervals and control duties being set based on a shift speed, a turbine RPM, and a transmission oil temperature, when the start condition of damper clutch operation control is satisfied; and
   executing a fuel cut control after a damper clutch is engaged by the damper clutch control operation.

2. The method of claim 1, further comprising disengaging the damper clutch and completing the fuel cut control if a predetermined disengagement condition of the damper clutch exists.

3. The method of claim 1, wherein the fuel cut control is executed depending on a dual fuel cut map in order to enlarge a fuel cut range, the dual fuel cut map having different fuel-cut ranges for an engagement state of the damper clutch and a disengagement state of the damper clutch.

4. The method of claim 1, wherein the start condition of the damper clutch control operation is determined to exist: when a throttle opening is lower than a predetermined opening; when a turbine RPM is higher than a first predetermined RPM; when a transmission oil temperature is higher than a predetermined temperature; when the turbine RPM is higher than a second predetermined RPM, calculated by adding a compensation RPM to a predetermined fuel-cut recovery RPM under an engagement of the damper clutch; when a current shift speed is higher than a predetermined shift speed; when a vehicle does not travel on a downgrade; and when a damper clutch is in the direct engagement state before the upshift.

5. The method of claim 1, wherein the control intervals comprise a first control interval, a second control interval, and a third control interval;
   the control duties comprise a first control duty, a second control duty, and a third control duty; and
   the damper clutch control operation comprises,
   outputting the first control duty during the first control interval, when the upshift is started in the power-off state;
   outputting the second control duty during the second control interval after the first control interval;
   outputting the third control duty during the third control interval after the second control interval; and
   operating feed back control in order for slip quantity of torque converter to reach target slip quantity after the third control interval.

6. The method of claim 5, wherein the damper clutch control operation further comprises increasing a control duty by a predetermined amount in order to further increase shift feel, when a slip quantity of a torque converter reaches the target slip quantity.

7. The method of claim 5, wherein the damper clutch control operation further comprises finishing the damper clutch control operation, when a slip quantity detected during the first control interval is higher than a reference slip quantity.

8. The method of claim 2, wherein the disengagement condition of the damper clutch is determined to exist: when a turbine RPM is lower than a third predetermined RPM for intercepting shock when the fuel cut control is finished; when a throttle opening is higher than a predetermined opening, that is, the throttle opening is in a condition of a power-on; when the turbine RPM is lower than the first predetermined RPM; when the turbine RPM is lower than the second predetermined RPM, calculated by adding a compensation RPM to the predetermined fuel-cut recovery RPM under the engagement of the damper clutch; when a changing rate (%/sec) of throttle opening is higher than a predetermined changing rate; when a slope rate (%) is higher than a predetermined slope rate; or when a slip quantity (engine RPM-turbine RPM) is higher than a predetermined RPM.

* * * * *